United States Patent
Elliott et al.

(10) Patent No.: US 7,055,387 B2
(45) Date of Patent: Jun. 6, 2006

(54) APPARATUS FOR AND METHOD OF SENSING A MEASURED INPUT

(75) Inventors: Richard Elliott, Stoneham, MA (US); Paul A. Ward, Dedham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 10/898,009

(22) Filed: Jul. 23, 2004

(65) Prior Publication Data

US 2005/0145030 A1    Jul. 7, 2005

Related U.S. Application Data

(60) Provisional application No. 60/490,157, filed on Jul. 25, 2003.

(51) Int. Cl.
*G01P 15/00* (2006.01)

(52) U.S. Cl. .............................. 73/514.18; 73/862.61

(58) Field of Classification Search ............ 73/514.17, 73/514.18, 514.32, 862.61
See application file for complete search history.

(56) References Cited

U.S. PATENT DOCUMENTS

| | | | | |
|---|---|---|---|---|
| 4,483,194 A | * | 11/1984 | Rudolf | 73/514.18 |
| 5,009,111 A | * | 4/1991 | West et al. | 73/862.61 |
| 5,454,266 A | * | 10/1995 | Chevroulet et al. | 73/514.18 |
| 5,744,717 A | * | 4/1998 | Tanten et al. | 73/514.18 |

* cited by examiner

*Primary Examiner*—Helen Kwok
(74) *Attorney, Agent, or Firm*—Goodwin Procter LLP (57) ABSTRACT

Apparatus is used in sensing a measured input. The apparatus includes a capacitor with a capacitance that varies non-linearly in response to the measured input, and a circuitry that derives, from the capacitance, a signal that varies substantially linearly with the measured input. The capacitor includes a first electrode, a second electrode, and a gap defined by a space between the electrode. The circuitry includes an amplifier with a first input terminal in electrical communication with the first electrode, a second input terminal, and an output terminal in electrical communication with the second electrode. The capacitance of the capacitor varies as an inverse of the gap of the capacitor, the gap of the capacitor varies in response to changes in the measured input, and the signal is derived from an output of the amplifier.

23 Claims, 6 Drawing Sheets

APPARATUS FOR AND METHOD OF SENSING A MEASURED INPUT

CROSS-REFERENCE TO RELATED APPLICATION

This application claims priority to U.S. Provisional Application No. 60/490,157, filed Jul. 25, 2003, the contents of which are incorporated herein by reference.

FIELD OF THE INVENTION

The invention relates to sensing a measured input.

BACKGROUND

Capacitive sensors are often employed to sense a measured input (e.g., acceleration, velocity, position) and provide a capacitive output that is representative of the input. In operation, such sensors include one or more capacitors whose capacitance varies in response to changes in the value of the measured input. These variable capacitors can be employed in measurement circuitry that translates the capacitance value or values into a corresponding value of the measured input. Often, however, a non-linear relationship exists between the change in capacitance and the measured input. Because non-linearity creates disadvantageous effects (e.g., by intorducing distortion into the output of the measurement circuitry), it is desirable to reduce or eliminate the non-linearity introduced into the measurement by the variable capacitance.

Figure 1:
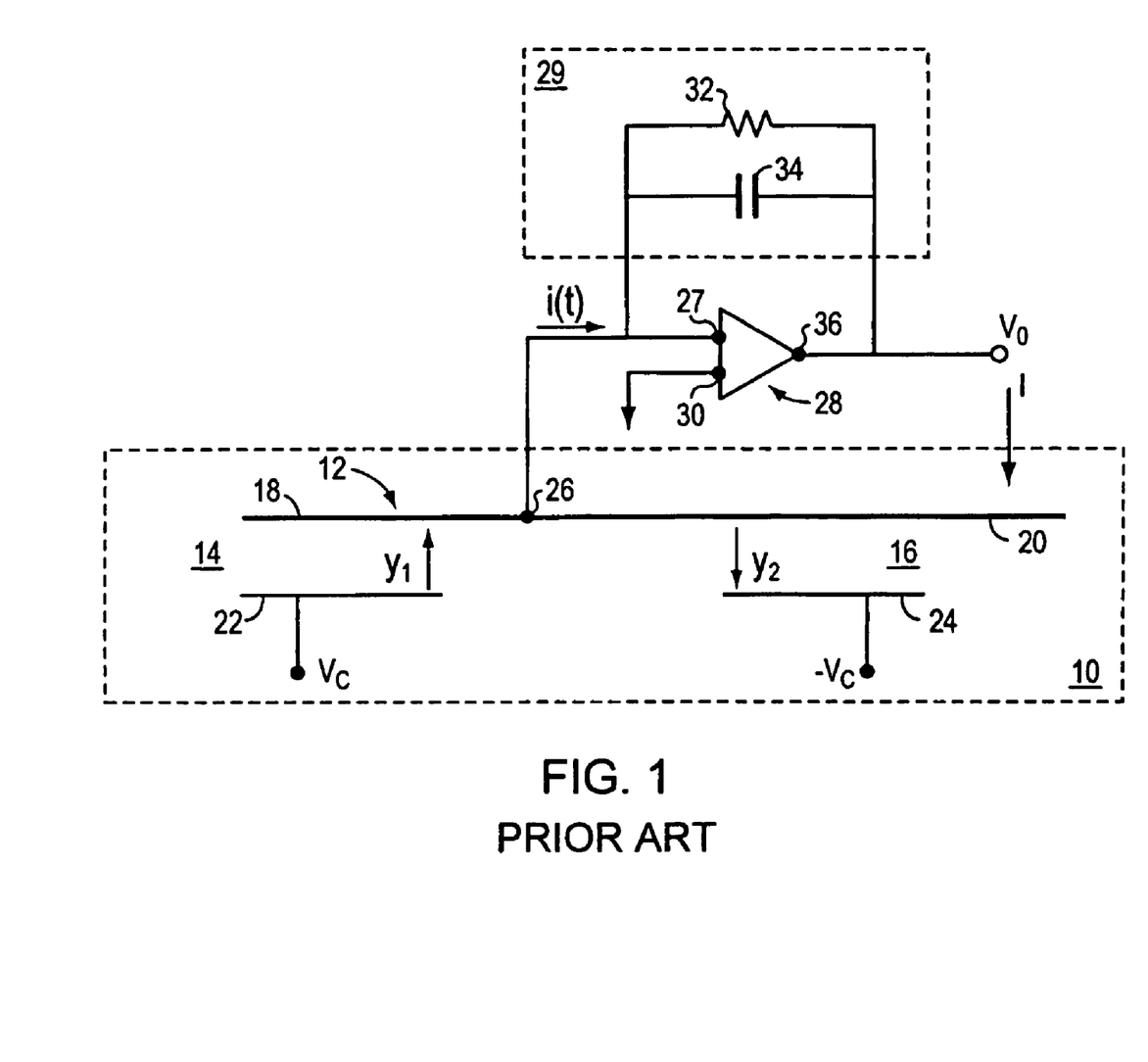
FIG. 1 is a schematic diagram of a prior art embodiment of a circuit and a sensor used to sense a measured input.

For example, FIG. 1 shows a prior art circuit employing a micro electro-mechanical system ("MEMS") to sense acceleration. The MEMS includes a sensor 10 configured in a differential capacitive bridge. The sensor 10 includes a proof mass 12, a first capacitor 14, and a second capacitor 16. A left side 18 of the proof mass 12 provides a moveable electrode for the first capacitor 14. A right side 20 of the proof mass 12 provides a moveable electrode for the second capacitor 16. Each of the first capacitor 14 and the second capacitor 16 include a fixed electrode 22 and 24, respectively. The fixed electrode 22 is connected to a positive supply voltage $V_c$, and the fixed electrode 24 is connected to a negative supply voltage $-V_c$. A connection point 26 of the proof mass 12 is connected to a first input terminal 27 of an amplifier 28 to supply a signal $V_o$ responsive to a measured input I. A second input terminal 30 of the amplifier 28 is connected to ground. A feedback resistor 32 and a fixed capacitor 34 are connected between an output terminal 36 of the amplifier 28 and the first input terminal 27, i.e., in a feedback circuit 29 of the amplifier 28. The output voltage $V_o$, is supplied by the amplifier at the output terminal 36.

The gap of capacitor 14 is represented by $y_1$ and the gap of capacitor 16 is represented by $y_2$. A nominal gap (for example, the gap when the measured input is zero) occurs when the proof mass 12 is in a null position. In operation, the measured input (acceleration) acts on the right side 20 of the proof mass 12. In response to the acceleration, the proof mass 12 pivots about the connection point 26. For example, where positive acceleration is in the downward direction at the right side 20 of the proof mass 12, a positive acceleration will cause gap $y_1$ to increase and gap $y_2$ to decrease as shown by the arrows associated with each capacitor 14, 16. Because capacitance is determined, in part, by the gap between the electrodes of the capacitor, the capacitances of both capacitors 14, 16 change as the corresponding gap changes (i.e., an increase in the gap decreases the capacitance). Further, the voltage that is supplied to the first input terminal also varies as the capacitances of capacitors 14, 16 change. For example, when the proof mass 12 is in the null position the gap $y_1$ equals the gap $y_2$. As a result the signal appearing at the connection point 26, and output voltage $V_o$ both equal zero. However, as the proof mass 12 rotates about the connection point 26, the difference in the capacitance of the first capacitor 14 and the capacitance of the second capacitor 16 result in a non-zero output voltage $V_o$ being generated at the output terminal 36 of the amplifier 28.

As is shown by Equation 1, the output voltage $V_o$ of the circuit in FIG. 1 is non-linear because $V_o$ is proportional to the capacitance which varies inversely with changes in the gap between the electrodes.

$$V_o = \frac{-v_E}{C_f}\left[\Delta C_0 - \frac{\Sigma C_0}{y_0}y + \frac{\Delta C_0}{y_0^2}y^2 - \frac{\Sigma C_0}{y_0^3}y^3 + \frac{\Delta C_0}{y_0^4}y^4 - \ldots\right] \quad (1)$$

In Equation 1, the term $y_0$ represents the nominal gap, i.e., the gap between electrodes when the proof mass 12 is in the null position. The term $\Delta C_0$ represents the difference between the capacitances of capacitor 14 and capacitor 16 when the proof mass is in the null position. Generally, this difference is due to manufacturing tolerances found in the fabrication of the sensor 10. $C_f$ is the capacitance of the fixed capacitor 32. The term $\Sigma C_0$ represents the sum of the capacitance of capacitor 14 and the capacitance of capacitor 16 when the proof mass 12 is in the null position. The non-linearity is introduced by the terms that are raised to a power greater than one (i.e., $y^2$, $y^3$). These are dependent on the change in the gap (represented by y) when the proof mass 12 is moved from the null position.

Figure 2:
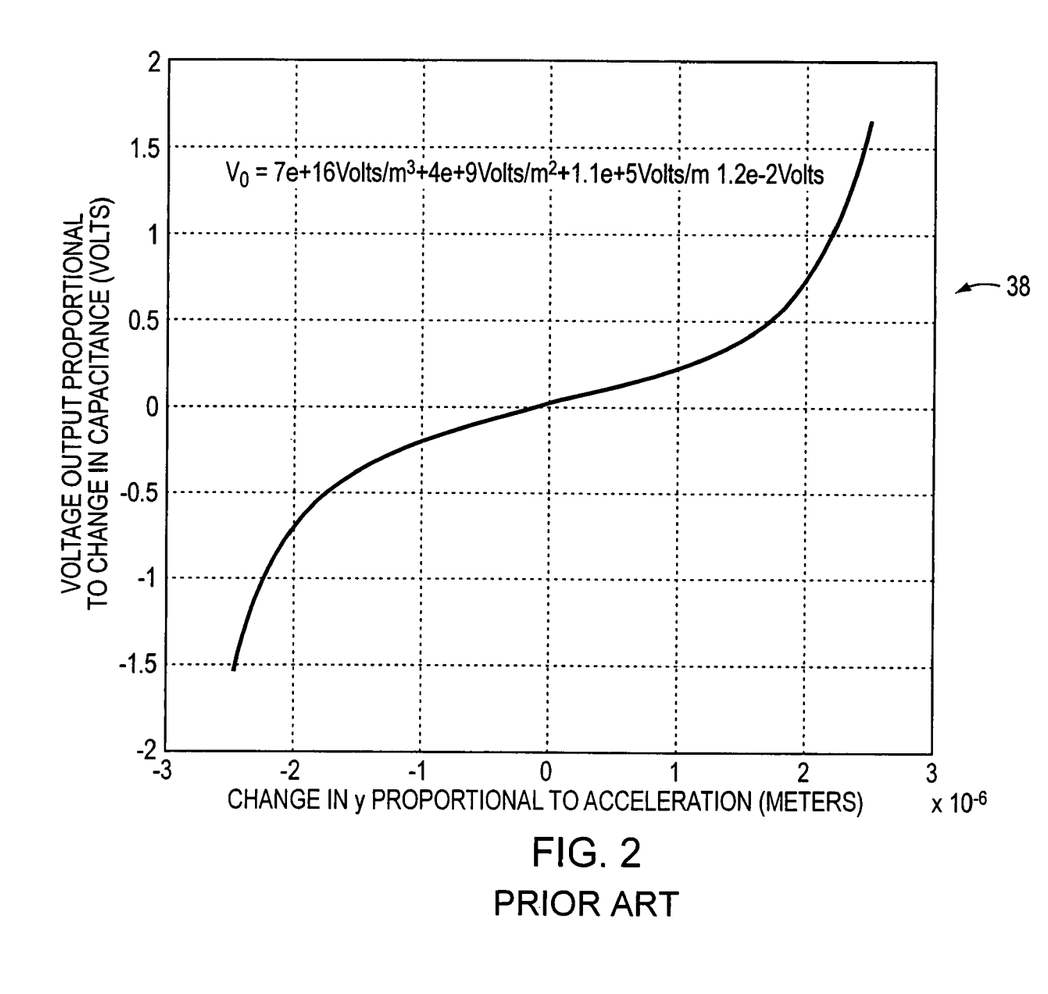
FIG. 2 is a graph of the relationship between the output of the circuit of FIG. 1 and the change in the measured input.

The non-linearity is shown in FIG. 2 where $V_o$ varies non-linearly in relation to the change in the gap y. In FIG. 2, the y-axis represents the output voltage $V_o$ and the x-axis represents the change in the gap y in response to the measured input.

One approach to dealing with the non-linear response of the circuitry has been to employ a force rebalance loop. Such an approach is also referred to as employing a closed loop architecture. A force rebalance loop applies a signal to the sensor to counteract the affects of the measured input and maintain the proof mass 26 in the null position. The calculated value of the measured input is derived from the signal that is required to maintain the proof mass 26 in the null position. However, force rebalance loops are problematic because they add a substantial degree of complexity to both the design of the sensor and the design of the electronic circuit. As a result, closed loop architecture is more difficult to produce, requires additional area in the integrated circuit, and dissipates more power. Additional disadvantages of closed loop architecture include limited bandwidth and poor performance in an environment that includes vibration such as those that are often encountered in applications where capacitive sensors are employed.

SUMMARY OF THE INVENTION

In one aspect of the invention, an apparatus for use in sensing a measured input includes a capacitor with a capacitance that varies non-linearly in response to the measured input, and a circuitry that derives, from the capacitance, a signal that varies substantially linearly with the measured input. The capacitor includes a first electrode, a second electrode, and a gap defined by a space between the electrode. The circuitry includes an amplifier with a first input terminal in electrical communication with the first electrode, a second input terminal, and an output terminal in electrical communication with the second electrode. The capacitance of the capacitor varies as an inverse of the gap of the capacitor, the gap of the capacitor varies in response to changes in the measured input, and the signal is derived from an output of the amplifier. Further, the capacitor is a first capacitor, and the circuitry is a first circuitry. In one embodiment, the measured input is acceleration. In another embodiment, the measured input is applied to a micro electro-mechanical system that includes the first capacitor. In a version of this embodiment, the micro electro-mechanical system includes a second capacitor that is fabricated on a substrate that is common to both the first capacitor and the second capacitor.

In another aspect, the invention provides a method of generating a substantially linear signal in response to an input detected by a sensor. The sensor includes a capacitance value that varies non-linearly in response to the input. The gap of a first sensing capacitor that is connected in the feedback circuit of a first amplifier varies in response to the sensor input. The gap of a second sensing capacitor that is connected in the feedback circuit of a second amplifier also varies in response to the sensor input. The capacitance of the first sensing capacitor varies as an inverse of the gap of the first sensing capacitor, and the capacitance of the second capacitor varies as an inverse of the gap of the second sensing capacitor. A substantially linear signal is generated, at least in part, from an output of the first amplifier and an output of the second amplifier. In one embodiment, the first sensing capacitor and the second sensing capacitor are mechanically coupled and electrically isolated.

In yet another aspect, the invention provides a method of improving the linearity of an output signal generated in response to a non-linear capacitive input. A first variable capacitance responsive to sensor input is connected in a feedback circuit of a first amplifier. A second variable capacitor responsive to the sensor input is connected in a feedback circuit of a second amplifier. An output of the first amplifier and an output of the second amplifier are summed to generate an output signal.

In still another aspect of the invention, a linear open loop micro electro-mechanical system comprising a capacitive pickoff includes a first amplifier, a second amplifier, a first capacitor, a second capacitor, a first proof mass, and a second proof mass. Each of the first amplifier and the second amplifier include a first input terminal, a second input terminal and an output terminal. Each of the first capacitor and the second capacitor include a moveable electrode and a fixed electrode. One of the moveable electrode and the fixed electrode of the first capacitor is in electrical communication with the output terminal of the first amplifier. The linear open loop system generates a substantially linear signal representative of a measured input in response to changes in both a capacitance of the first capacitor and changes in a capacitance of the second capacitor.

At least one embodiment of the invention substantially reduces or entirely eliminates the non-linearity of an output signal that is derived by measurement circuitry in response to a non-linear sensor input, e.g., capacitance.

DETAILED DESCRIPTION

Figure 3:
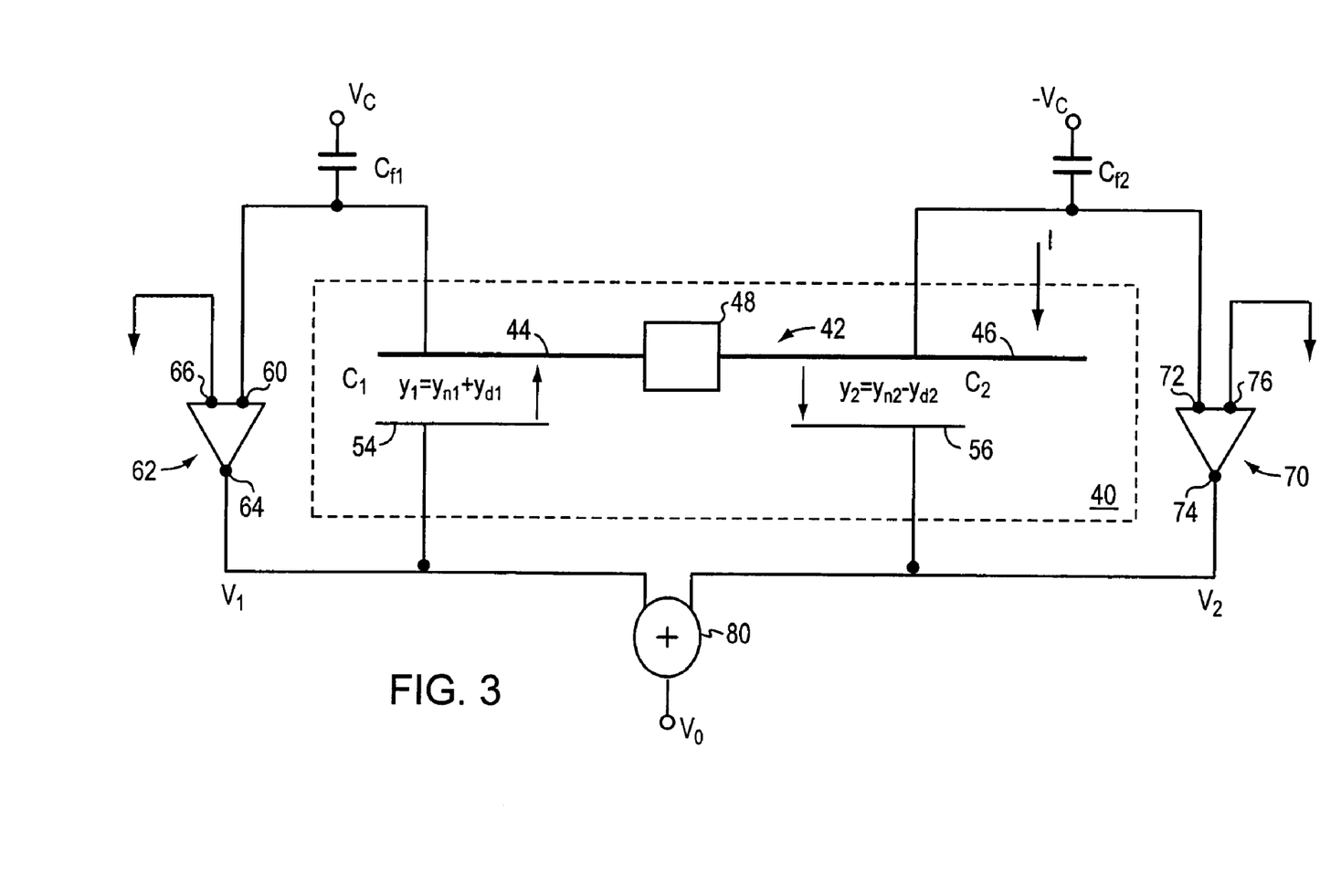
FIG. 3 is a schematic diagram of a circuit and a sensor in accordance with the invention.

Referring now to FIG. 3, one embodiment of a sensor 40 that is responsive to a measured input is shown. The sensor 40 includes a proof mass 42 with an isolation point 48. The isolation point electrically isolates a moveable electrode 44 for a first capacitor C1 from a moveable electrode 46 for a second capacitor C2. Although the moveable electrodes 44, 46 are electrically isolated from one another, they remain mechanically coupled via the isolation point 48. In at least one embodiment, the isolation point 48 is an electrical insulation material such as with a dielectric value that is sufficient to maintain the electrical isolation between the electrodes 44, 46. The first capacitor C1 also includes a fixed electrode 54. Similarly, the second capacitor includes a fixed electrode 56. The proof mass 42 rotates axially, within a limited range, around a pivot point located between the first capacitor C1 and the second capacitor C2 when a measured input I is applied to the proof mass 42. For purposes of the description herein, the pivot point and the isolation point 48 are described as being located at the same point on the proof mass 42. However, it will be recognized by those of ordinary skill in the art that the pivot point and the isolation point 48 need not be located at the same point on the proof mass 42. In the embodiment shown in FIG. 3, the moveable electrodes 44, 46 are located equidistant from the pivot point in order to insure that the moveable electrodes 44, 46 travel the same distance when the measured input I is applied to the sensor 40. Although the measured input I is shown as rotating the proof mass 46 in a clockwise direction in FIG. 3, the sensor 40 is also responsive to a measured input I applied in a direction opposite to that shown in FIG. 3. A measured input applied in a direction opposite that shown in FIG. 3 rotates the proof mass 42 in a counterclockwise direction. For example, where the sensor is attached to an object and positive acceleration of the object results in clockwise rotation then negative acceleration would result in counterclockwise rotation of the proof mass 42. In at least one embodiment, the sensor is a micro electro-mechanical system (MEMS).

The first capacitor C1 has a gap $y_1$ defined by the space between the moveable electrode 44 and the fixed electrode 54. Similarly, the second capacitor C2 has a gap $y_2$ defined by the space between the moveable electrode 46 the fixed electrode 56. When the proof mass 42 is located in the null position, the gap $y_1$ of the first capacitor C1 equals $y_{n1}$ and the gap of the second capacitor $y_2$ equals $y_{n2}$. In at least one embodiment, the sensor 40 is constructed such that $y_{n1}$ equals $y_{n2}$. When the proof mass 42 rotates out of the null position the gaps $y_{n1}$ and $y_{n2}$ each change. That is, the gap $y_1$ of the first capacitor C1 changes by a distance of $y_{d1}$ and the gap $y_2$ of the second capacitor C2 changes by a distance of $y_{d2}$. When the proof mass 42 is rotated in a clockwise direction, the gap $y_2$ of the first capacitor C1 increases such that the resulting gap equals $y_{n1}$ plus $y_{d1}$. The clockwise rotation of the proof mass 42 results in the gap $y_2$ of the second capacitor that equals $y_{n2}$ less $y_{d2}$. Because the electrodes 44, 46 are located equidistant from the pivot point $y_{d1}$ equals $y_{d2}$. Conversely, counterclockwise rotation of proof mass 42 results in a change in gaps $y_1$ and $y_2$ such that $y_1$ equals $y_{n1}$ less $y_{d1}$, and $y_2$ equals $y_{n2}$ plus $y_{d2}$. The change in the gaps $y_1$ and $y_2$ is linear with the change in the measured input. However, as mentioned above, the capacitance changes non-linearly because the capacitance varies as 1/gap.

In the embodiment shown in FIG. 3, the moveable electrode of the first capacitor 44 is connected to a first input terminal 60 of a first amplifier 62, and the fixed electrode 54 is connected to an output terminal 64 of the first amplifier 62. Thus, the first capacitor C1 is connected in a feedback circuit of the first amplifier 62. Here, feedback circuit is used to describe any circuitry connected between an amplifier input terminal and an amplifier output terminal, e.g., the capacitor C1. Of course, the feedback circuit can include additional elements, e.g., resistors. A second input terminal 66 of the first amplifier 62 is connected to ground. A fixed capacitor $C_{f1}$ is connected in series between the first terminal of the amplifier 60 and an input voltage $V_c$. In at least one embodiment, the input voltage $V_c$ is a sinusoidal voltage.

Similarly, the second capacitor C2 is connected in a feedback circuit of a second amplifier 70. Specifically, the moveable electrode 46 is connected to a first input terminal 72 of the second capacitor C2, and the fixed electrode 56 is connected to an output terminal 74. The second amplifier 70 also includes a second input terminal 76 that is connected to ground. A fixed capacitor $C_{f2}$ is connected in series between the first terminal of the second amplifier 70 and an input voltage $-V_c$. In at least one embodiment, the input voltage $-V_c$ is a sinusoidal voltage.

Because of manufacturing tolerances, the static capacitance (i.e., when the proof mass is at the null position) of the capacitor C1 may not equal the static capacitance of the capacitor C2. Therefore, the fixed capacitors $C_{f1}$ and $C_{f2}$ are sized to eliminate the effects of the differences in this static offset between C1 and C2. That is, the static offset does not amplify the non-linearity of the changes in capacitance as was found in the prior art.

A first output voltage $V_1$ is generated at the output terminal 64 of the first amplifier 62, and a second output voltage $V_2$ is generated at the output terminal 74 of the second amplifier 70. In FIG. 3, the first output voltage $V_1$ and the second output voltage $V_2$ are combined by circuitry (represented by node 80) that sums the two voltages $V_1$ and $V_2$ to derive an output voltage $V_0$.

The output voltage $V_0$ can be calculated using Equation 2 below. The fixed terms of Equation 2 include: 1) input voltage $V_c$; 2) the capacitance of the fixed capacitor $C_{f1}$; 3) the capacitance of capacitor C1 and the size of the gap $y_1$ when the proof mass 42 is in the null position (represented by $C_{01}$ and $y_{n1}$, respectively); 4) the capacitance of the fixed capacitor $C_{f2}$; 5) the capacitance of capacitor C2 and the size of the gap $y_2$ when the proof mass 42 is in the null position (represented by $C_{02}$ and $y_{n2}$, respectively). The variable terms in Equation 2 are limited to the change in the gap of capacitor C1, represented by $y_{d1}$, and the change in the gap of capacitor C2, represented by $y_{d2}$. Thus, in response to the measured input, Equation 2 produces a signal (i.e., output voltage $V_o$) that varies linearly with the change in the gap of the two capacitors C1 and C2.

$$V_o = V_C \cdot \left( \frac{C_{f1}}{C_{01}} - \frac{C_{f2}}{C_{02}} \right) + V_C \cdot \left( \frac{y_{d1}}{y_{n1}} \frac{C_{f1}}{C_{01}} + \frac{y_{d2}}{y_{n2}} \frac{C_{f2}}{C_{02}} \right) \quad (2)$$

Figure 4:
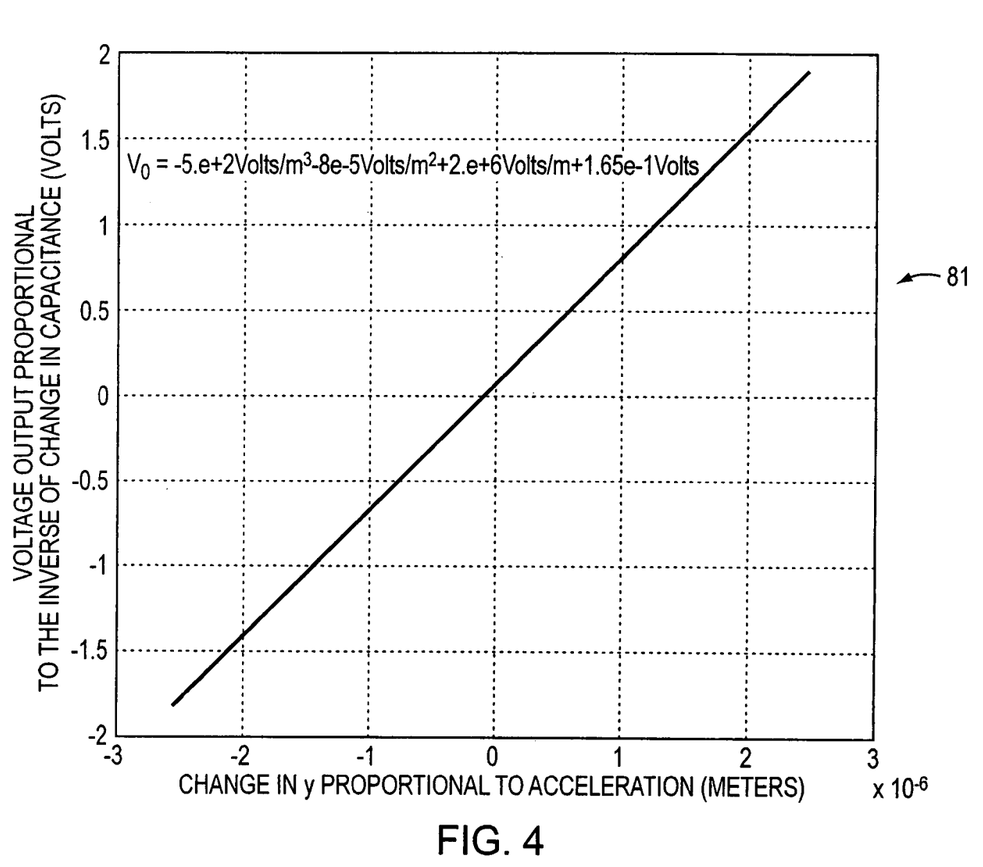
FIG. 4 is a graph showing the relationship between the output of the circuit of FIG. 3 and a change in the measured input.

In FIG. 4, the y-axis represents the output voltage $V_0$ and the x-axis represents the change in the gap y in response to the measured input I. The linearity is shown in FIG. 4 where a graph 81 demonstrates how $V_0$ varies linearly in relation to the change in the gap y of the sensors (i.e., $y_{d1}$ and $y_{d2}$) despite the non-linearity of the change in capacitance of the capacitors C1 and C2.

Figure 5:
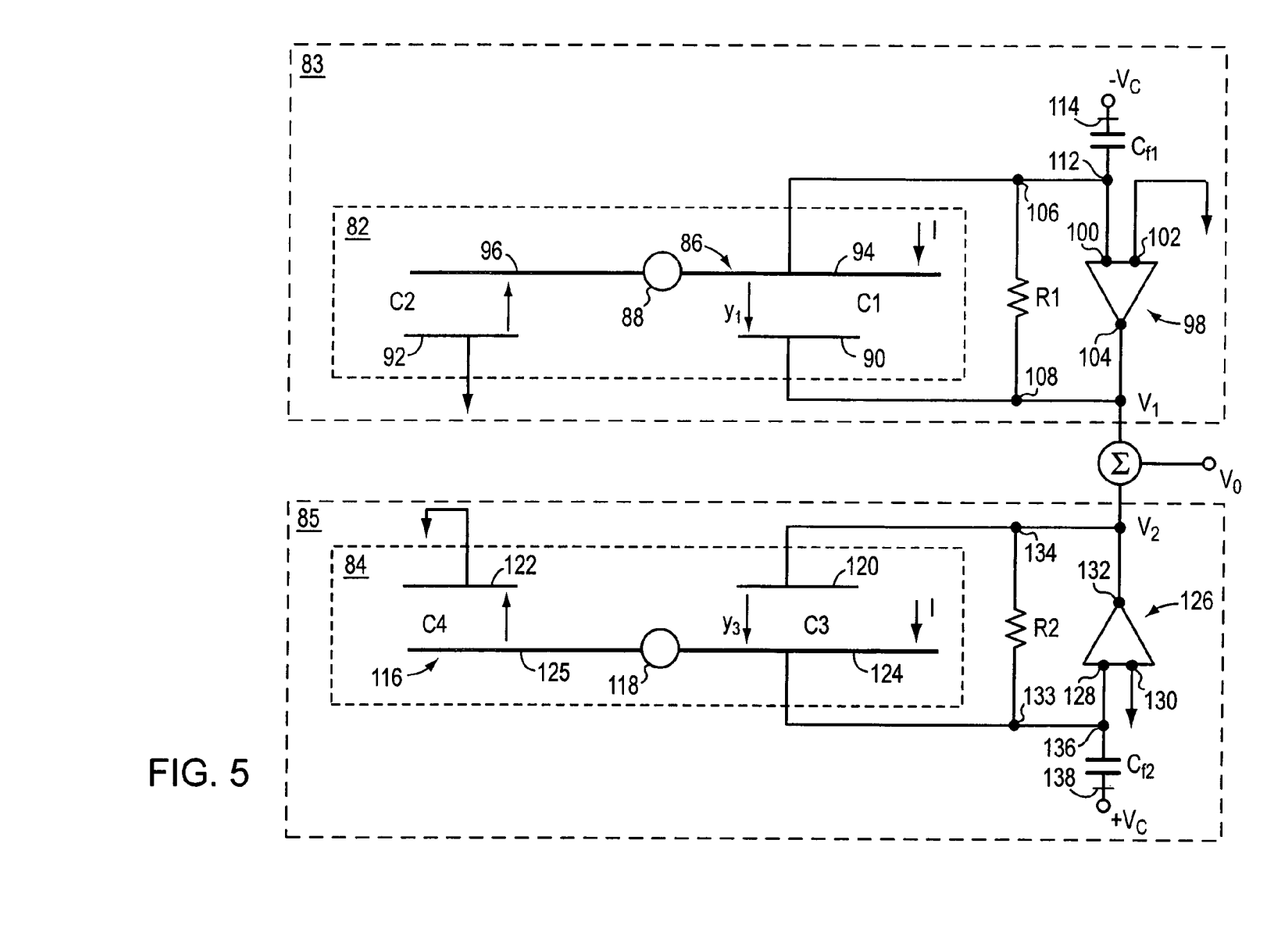
FIG. 5 is a schematic diagram of a circuit and sensors in accordance with another embodiment of the invention.

An embodiment of the invention using two sensors is shown in FIG. 5. In FIG. 5, a measured input I is detected by both a first sensor 82 and a second sensor 84 employed in first circuitry 83 and second circuitry 85, respectively. A linear signal $V_o$ is generated from a first substantially linear signal that is derived from the first sensor 82 and a second substantially linear signal that is derived from the second sensor 84. Sensor inputs (i.e., the feedback supplied by the sensor in response to the measured input I) are provided by a single capacitor from each of the first circuitry 83 and the second circuitry 85.

The first sensor 82 includes a first capacitor C1 and a second capacitor C2. However, because the embodiment shown in FIG. 5 employs two sensors, the second capacitor C2 is not used to supply a sensor input in the first circuitry 83. The sensor 82 includes a proof mass 86 with an isolation and pivot point 88, a fixed electrode 90 for the first capacitor C1 and a fixed electrode 92 for the second capacitor C2. The proof mass 86 includes a moveable electrode 94 for the first capacitor C1 and a moveable electrode 96 for the second capacitor C2. The first capacitor C1 is employed in the first circuitry 83 along with resistor R1, a fixed capacitor $C_{f1}$, and an amplifier 98. The amplifier 98 includes a first input terminal 100 connected to the moveable electrode 94 of the first capacitor C1, a second input terminal 102 connected to ground, and an output terminal 104 connected to the fixed electrode 92 of the first capacitor C1. The resistor R1 includes a first terminal 106 connected to the first input terminal 100 of the amplifier 98, and a second terminal 108 connected to the output terminal 104 of the amplifier 98. The first fixed capacitor $C_{f1}$ includes a first terminal 112 connected to the first input terminal 100 of the amplifier 98 and a second terminal 114 connected to a voltage supply $-V_c$, i.e., in a feed forward path of the amplifier 98. In at least one embodiment, the voltage supply $-V_c$ is a sinusoidal voltage. The connections of the first capacitor C1 and the resistor R1 place the two elements in parallel with one another in the feedback circuit of first amplifier 98. The configuration of the first circuitry 83 results in an output signal $V_1$ that is derived, at least in part, from the first capacitor C1 and appears at the output terminal 104 of the amplifier 98.

The first capacitor C1 has a gap $y_1$ defined by the space between the moveable electrode 94 and the fixed electrode 90. When the proof mass 86 is located in the null position, the gap $y_1$ of the first capacitor C1 equals $y_{n1}$. However, when the proof mass 86 rotates out of the null position in response to the measured input I the gap $y_1$ changes. That is, the gap $y_1$ of the first capacitor C1 changes by a distance of $Y_{d1}$. Thus, when the proof mass 86 is rotated in a clockwise direction from the null position, the gap $y_1$ of the first capacitor C1 decreases such that the resulting gap equals $y_{n1}$ less $y_{d1}$. Conversely, counterclockwise rotation of the proof mass 86 from the null position results in the gap $y_1$ of the first capacitor being equal to $y_{n1}$ plus $y_{d2}$. Although the capacitance of C1 varies inversely relative to the changes in the gap $y_1$, the architecture of the first circuitry 83 results in an output signal $V_1$ that varies substantially linearly in response to the measured input I and appears at the output terminal 104 of the amplifier 98.

The second sensor 84 is employed in the second circuitry 85 to derive a second output signal $V_2$ that varies substantially linearly in response to the measured input I. The second sensor 84 includes a first capacitor C3 and a second capacitor C4. However, the second capacitor C4 is not used in the second circuitry 85 to derive the second output signal. The sensor 84 includes a proof mass 116 with an isolation and pivot point 118, a fixed electrode 120 for the first capacitor C3, and a fixed electrode 122 for the second capacitor C4. The proof mass 116 includes a moveable electrode 124 for the first capacitor C3 and a moveable electrode 125 for the second capacitor C4. The first capacitor C3 is employed in the second circuitry 85 along with the resistor R2, a fixed capacitor $C_{f2}$, and an amplifier 126. The amplifier 126 includes a first input terminal 128 connected to the moveable electrode 124 of the first capacitor C3, a second input terminal 130 connected to ground, and an output terminal 132 connected to the fixed electrode 120 of the first capacitor C3. The resistor R2 includes a first terminal 133 connected to the first input terminal 128 of the amplifier 126, and a second terminal 134 connected to the output terminal 132 of the amplifier 126. A second fixed capacitor $C_{f2}$ includes a first terminal 136 connected to the first input terminal 128 of the amplifier 126 and a second terminal 138 connected to a voltage supply +Vc. In at least one embodiment, the voltage supply +Vc is a sinusoidal voltage. The connections of the first capacitor C3 and the resistor R2 between the first input terminal 128 and the output terminal 132 place the two elements in parallel with one another in the feedback circuit of amplifier 126. The configuration of the second circuitry 85 results in an output signal $V_2$ that is derived, at least in part, from the first capacitor C3 and appears at the output terminal 132 of the amplifier 126.

The first capacitor C3 has a gap $y_3$ defined by the space between the moveable electrode 124 and the fixed electrode 120. When the proof mass 116 is located in the null position, the gap $y_3$ of the first capacitor C3 equals $y_{n3}$. However, when the proof mass 116 rotates out of the null position in response to the measured input I the gap $y_3$ changes. That is, the gap $y_3$ of the first capacitor C3 changes by a distance of $y_{d3}$. Thus, when the proof mass 116 is rotated in a clockwise direction from the null position, the gap $y_1$ of the first capacitor C3 increases such that the resulting gap equals $y_{n3}$ plus $y_{d3}$. Conversely, counterclockwise rotation of the proof mass 116 from the null position results in the gap $y_3$ of the first capacitor C3 being equal to $y_{n3}$ minus $y_{d3}$. Although the capacitance of C3 varies inversely relative to the changes in the gap $y_3$, the architecture of the second circuitry 85 results in a substantially linear output signal appearing at the output terminal 132 of the amplifier 126.

The orientation of the second sensor 84 differs from the orientation of the first sensor 82. As a result, when the capacitance of the capacitor C1 increases in response to the measured input I, the capacitance of capacitor C3 decreases. Thus, the measured input I applied in the direction shown in FIG. 5 is detected by a decrease in the gap $y_1$ of capacitor C1 and an increase in the gap $y_3$ of capacitor C3. In at least one embodiment, the magnitude of the change in the gap $y_{d1}$ of capacitor C1 equals the magnitude of the change in the gap $y_{d3}$ of capacitor C3.

Figure 6:
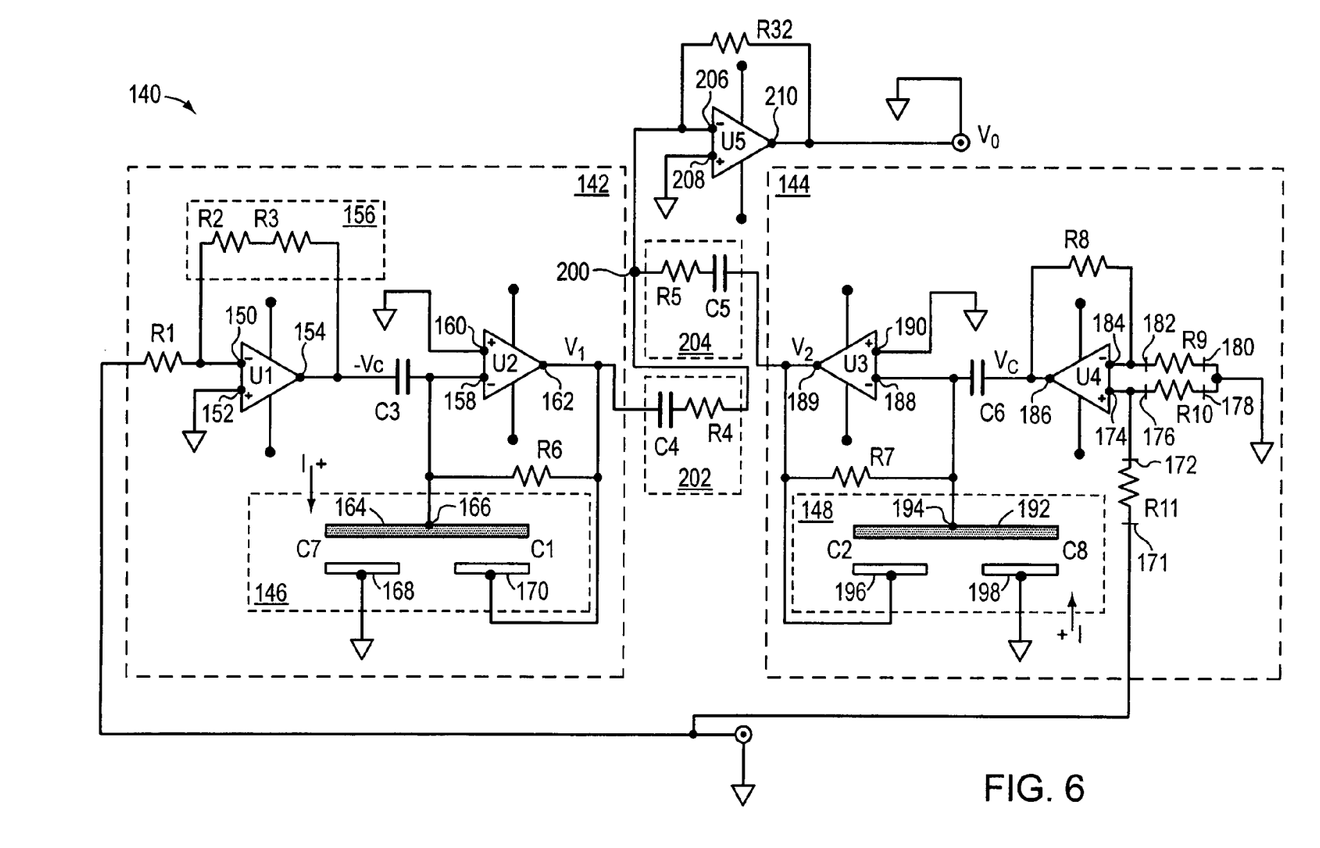
FIG. 6 is a schematic diagram of a circuit and sensors in accordance with a further embodiment of the invention.

FIG. 6 shows a schematic of another embodiment that employs two separate sensors to provide a substantially linear output signal in response to a measured input I. The overall layout of circuit 140 includes a carrier signal $V_{IN}$ that is supplied to a first circuitry 142 and a second circuitry 144. The first circuitry 142 includes two amplifiers U1 and U2, and a first sensor 146. Amplifier U1 is an inverting operational amplifier that generates a negative input voltage −Vc which is supplied via fixed capacitor C3 to the amplifier U2. A first sensing capacitor C1 is connected in a feedback circuit of the amplifier U2. The amplifier U2 derives a signal $V_1$, at least in part, from the first sensing capacitor C1. The signal $V_1$ varies substantially linearly with the measured input I. The second circuitry 144 includes two amplifiers U3 and U4 and a first sensor 148. Amplifier U4 is a non-inverting operational amplifier that generates a positive input voltage +Vc which is supplied via fixed capacitor C6 to the amplifier U3. A second sensing capacitor C2 is connected in a feedback circuit of the amplifier U3. The amplifier U3 derives a signal $V_2$, at least in part, from the second sensing capacitor C2. The signal $V_2$ varies substantially linearly with the measured input I. The signals $V_1$ and $V_2$ are supplied to a summing amplifier U5 where they are summed to generate the output signal $V_o$.

Describing the first circuitry 142 of FIG. 6 in greater detail, the amplifier U1 includes a first input terminal 150 connected to the carrier signal $V_{IN}$ via resistor R1, a second input terminal 152 connected to ground, and an output terminal 154. In at least one embodiment, the first input terminal 150 is an inverting input terminal and the second input terminal 152 is a non-inverting input terminal. The resistors R2 and R3 are connected in a series network 156 between the first input terminal 150 and the output terminal 154, i.e., in the feedback circuit of amplifier U1. A capacitor C3 is connected in series between the output terminal 154 of the amplifier U1 and a first input terminal 158 of the amplifier U2. The amplifier U2 also includes an output terminal 162, and a second input terminal 160 that is connected to ground. The sensor 146 includes a proof mass 164 that pivots about a pivot point 166 in response to the measured input I. The proof mass 164 is a moveable electrode for two capacitors C1 and C7. However, the capacitance of capacitor C7 is not used and a fixed electrode 168 for capacitor C7 is connected to ground. A fixed electrode 170 for the capacitor C1 is connected to the output terminal 162 of the amplifier U2. The proof mass 164 is connected to the first input terminal 158 of the amplifier U2, thus, the resulting circuit architecture places the capacitor C1 in a feedback circuit of the amplifier U2. A resistor R6 is connected in parallel with the capacitor C1 in the feedback circuit. In at least one embodiment, the first input terminal 158 of the amplifier U2 is an inverting input terminal and the second input terminal 160 is a non-inverting input terminal.

Now describing the second circuitry 144 of FIG. 6 in greater detail, a resistor R11 includes a first terminal 171 connected to the carrier signal $V_{IN}$ and a second terminal 172 connected to a first input terminal 174 of the amplifier U4. A resistor R10 includes a first terminal 176 connected to the first input terminal 174 and a second terminal 178 connected to ground. A resistor R9 has a first terminal 180 connected to ground and a second terminal 182 connected to a second input terminal 184 of the amplifier U4. A resistor R8 is connected between the second input terminal 184 of the amplifier U4 and an output terminal 186 of the amplifier U4. In at least one embodiment, the first input terminal 174 is a non-inverting input terminal and the second input terminal 184 is an inverting input terminal. A capacitor C6 is connected in series between the output terminal 186 of the amplifier U4 and a first input terminal 188 of the amplifier U3. The amplifier U3 also includes an output terminal 189, and a second input terminal 190 that is connected to ground. The sensor 148 includes a proof mass 192 that pivots about a pivot point 194 in response to the measured input I. The proof mass 192 is a moveable electrode for two capacitors C2 and C8. A fixed electrode 196 for the capacitor C2 is connected to the output terminal 189 of the amplifier U3. However, the capacitance of capacitor C8 is not used and a fixed electrode 198 of the capacitor C8 is connected to ground. The proof mass 192 is connected to the first input terminal 188 of the amplifier U3, thus, placing the capacitor C2 in a feedback circuit of the amplifier U3. A resistor R7 is connected in parallel with the capacitor C2 in the feedback circuit.

The output terminal of the amplifier U2 is connected to a common node 200 via a series network 202 of capacitor C4 and resistor R4. The output terminal of amplifier U3 is connected to the common node 200 via a series network 204 of capacitor C5 and resistor R5. The common node is connected to a first input terminal 206 of the summing amplifier U5. A second input terminal 208 of the summing amplifier U5 is connected to ground. An output terminal 210 of the summing amplifier U5 provides the output signal Vo of the circuit 140. The output signal $V_o$ is sinusoidal. A resistor R12 is connected between the first input terminal 206 and the output terminal 210 of the amplifier U5. In at least one embodiment, the output terminal 210 of the amplifier U5 is connected to a demodulator that is used to extract the amplitude information from the output signal $V_o$. The extracted amplitude information provides a means to detect a constant acceleration even though a constant acceleration results in the proof mass of each sensor 164, 192 remaining substantially stationary at some non-null position.

In operation, the proof mass 164 of capacitor C1 and the proof mass 192 of capacitor C2 pivot in response to the magnitude and direction (e.g., positive or negative) of the measured input I. The gap of the capacitors C1, C2 change as a result of changes in the direction and magnitude of the measured input and the corresponding rotation of the proof mass. The two sensors 146, 148 are oriented such that the change in the gap of the capacitors C1 is opposite the change in the gap of the capacitor C2, i.e., the gap of the capacitor C2 increases when the gap of the capacitor C1 decreases in response to changes in the measured input I. In at least one embodiment, the change in the gap of the capacitor C1 equals the change in the gap of the capacitor C2 in response to a change in the measured input I.

As described previously, capacitance varies inversely with changes in the gap of the capacitor; therefore, the capacitance of C1 and C2 vary inversely as the corresponding gap changes in response to the measured input I. However, the circuit architecture of circuit 140 results in a substantially linear signal $V_1$ being derived by the first circuitry 142 at the output terminal 162 of the amplifier U2, and a substantially linear signal $V_2$ being derived by the second circuitry 144 at the output terminal 189 of the amplifier U3. The two signals $V_1$ and $V_2$ are summed by the summing amplifier U5 to generate a substantially linear output $V_o$ in response to the measured input.

Describing the operation of the circuit 140 in greater detail, the gap of the capacitor C1 increases and the gap of the capacitor C2 decreases when the measured input I is positive. As a result, the capacitance of capacitor C1 decreases and the capacitance of capacitor C2 increases. In first circuitry 142, the negative change in capacitance combined with the negative voltage $-V_c$ produces a positive signal $V_1$ representative of the change in capacitance C1, e.g., a $+\Delta V$ where V is the change in voltage across the capacitor C1. In second circuitry 144, the positive change in capacitance combined with the positive voltage $+V_c$ produces a positive signal $V_2$ representative of the change in capacitance C2, e.g., a $+\Delta V$ where V is the change in voltage across the capacitor C2. Therefore, providing that the magnitude of the change in voltage across the two capacitors is the same for the two sensors, the resulting output $V_o$ equals $+2\Delta V$. Conversely, the output $V_o$ equals $-2\Delta V$ when the measured input I is negative.

While the invention has been shown and described with reference to specific embodiments, it should be understood by those of ordinary skill in the art that various changes in form and detail may be made therein without departing from the spirit and scope of the invention.

What is claimed is:

1. Apparatus for use in sensing a measured input, comprising:
   a capacitor having a capacitance that varies non-linearly in response to the measured input, the capacitor comprising a first electrode, a second electrode and a gap defined by a space between the electrodes; and
   circuitry that derives, from the capacitance, a signal that varies substantially linearly with the measured input, the circuitry comprising an amplifier comprising a first input terminal, a second input terminal, and an output terminal, the output terminal and the first input terminal defining a feedback path between the output terminal and the first input terminal,
   wherein the capacitance of the capacitor varies as an inverse of the gap of the capacitor,
   wherein the gap of the capacitor varies in response to changes in the measured input,
   wherein the capacitor is a first capacitor connected in the feedback path of the amplifier,
   wherein the circuitry is a first circuitry, and
   wherein the signal is derived from an output of the amplifier.

2. The apparatus as claimed in claim 1 wherein the measured input is acceleration.

3. The apparatus as claimed in claim 1, further comprising:
   a second capacitor having a capacitance that varies non-linearly in response to the measured input, the second capacitor comprising a first electrode, a second electrode and a gap defined by a space between the electrodes of the second capacitor; and
   second circuitry that derives, from the capacitance of the second capacitor, a signal that varies substantially linearly with the measured input, the second circuitry comprising a second amplifier comprising a first input terminal being in electrical communication with the first electrode of the second capacitor, a second input terminal, and an output terminal being in electrical communication with the second electrode of the second capacitor;
   wherein the capacitance of the second capacitor varies as an inverse of the gap of the second capacitor,
   wherein the gap of the second capacitor varies in response to changes in the measured input, and
   wherein the signal is derived from an output of the second amplifier.

4. The apparatus as claimed in claim 3, further comprising a first fixed capacitor comprising a first electrode in electrical communication with the first input terminal of the amplifier of the first circuitry, and a second electrode in electrical communication with a voltage input.

5. The apparatus as claimed in claim 3 wherein an output signal is derived by summing the signal derived by the first circuitry and the signal derived by the second circuitry.

6. The apparatus as claimed in claim 1 wherein the measured input is applied to a micro electro-mechanical system comprising the first capacitor.

7. The apparatus as claimed in claim 6 wherein the micro electro-mechanical system further comprises a second capacitor.

8. The apparatus as claimed in claim 7 wherein the first capacitor and the second capacitor are fabricated on a substrate that is common to each.

9. The apparatus as claimed in claim 8 wherein a first sensor comprises the first capacitor and a second sensor comprises the second capacitor.

10. A method of generating a substantially linear signal in response to an input detected by a sensor, the sensor comprising a capacitance value that varies non-linearly in response to the input, the method comprising the steps of:
  in response to a sensor input, varying a gap of a first sensing capacitor connected in a feedback circuit of a first amplifier;
  in response to the sensor input, varying a gap of a second sensing capacitor connected in a feedback circuit of a second amplifier; and
  generating a substantially linear signal comprising a sum of an output of the first amplifier and an output of the second amplifier,
  wherein capacitance of the first capacitor varies as an inverse of the gap of the first sensing capacitor, and
  wherein capacitance of the second capacitor varies as an inverse of the gap of the second sensing capacitor.

11. The method of claim 10 wherein the sensor input is acceleration.

12. The method of claim 11 wherein the substantially linear signal represents a sensor acceleration.

13. The method of claim 10 wherein the sensor comprises a micro electro-mechanical system.

14. The method of claim 13 wherein an accelerometer comprises the sensor.

15. The method of claim 10 wherein a first sensor comprises the first sensing capacitor and a second sensor comprises the second sensing capacitor.

16. The method of claim 10 wherein the first sensing capacitor and the second sensing capacitor are mechanically coupled and electrically isolated.

17. The method of claim 10, further comprising the steps of:
  connecting a first fixed capacitor in series with a voltage input to the first amplifier; and
  connecting a second fixed capacitor in series with a voltage input to the second amplifier.

18. The method of claim 17, further comprising the steps of:
  establishing a capacitance value of the first fixed capacitor in order to substantially eliminate effects on the output of the first amplifier of differences in a capacitance value of the first sensing capacitor and a capacitance value of the second sensing capacitor when the input is zero.

19. A linear open loop micro electro-mechanical system comprising a capacitive pickoff, the system comprising:
  a first amplifier comprising a first input terminal, a second input terminal, and an output terminal, the output terminal and the first input terminal defining a feedback path between the output terminal and the first input terminal;
  a second amplifier comprising a first input terminal, a second input terminal, and an output terminal;
  a first capacitor comprising a moveable electrode and a fixed electrode;
  a second capacitor comprising a moveable electrode and a fixed electrode;
  a first proof mass comprising the movable electrode of the first capacitor; and
  a second proof mass mechanically coupled to the first proof mass, the second proof mass comprising the movable electrode of the second capacitor,
  wherein the first capacitor is connected in the feedback path of the first amplifier, and
  wherein a substantially linear signal representative of a measured input is generated in response to changes in a capacitance of the first capacitor and changes in a capacitance of the second capacitor.

20. A method of improving linearity of an output signal generated in response to a non-linear capacitive input, the method comprising the steps of:
  connecting a first variable capacitance responsive to a sensor input in a feedback circuit of a first amplifier;
  connecting a second variable capacitance responsive to the sensor input in a feedback circuit of a second amplifier; and
  generating an output signal by summing an output of the first amplifier and an output of the second amplifier.

21. Apparatus for use in sensing a measured input, comprising:
  an amplifier having an output and an input, the output and the input defining a feedback path between the output and the input;
  a sensor in the feedback path, the sensor comprising a capacitor comprising a capacitance that varies non-linearly with the measured input; and
  circuitry that derives, from the output of the amplifier, a signal that varies substantially linearly with the measured input.

22. The apparatus of claim 21, wherein the capacitance varies non-linearly with physical acceleration.

23. The apparatus of claim 21, wherein the amplifier has a feedforward path, and the apparatus further comprises a fixed capacitor in the feedforward path.

* * * * *